US011264812B2

(12) United States Patent
Muenzel et al.

(10) Patent No.: US 11,264,812 B2
(45) Date of Patent: Mar. 1, 2022

(54) BATTERY SYSTEM

(71) Applicant: RELECTRIFY HOLDINGS PTY LTD, Cremorne (AU)

(72) Inventors: Jan Valentin Muenzel, Cremorne (AU); Daniel Crowley, Cremorne (AU)

(73) Assignee: RELECTRIFY HOLDINGS PTY LTD, Cremorne Vic (AU)

( * ) Notice: Subject to any disclaimer, the term of this patent is extended or adjusted under 35 U.S.C. 154(b) by 232 days.

(21) Appl. No.: 16/737,161

(22) Filed: Jan. 8, 2020

(65) Prior Publication Data

US 2020/0144830 A1    May 7, 2020

Related U.S. Application Data

(63) Continuation-in-part of application No. 15/760,173, filed as application No. PCT/AU2016/050917 on Sep. 29, 2016, now Pat. No. 10,573,935.

(30) Foreign Application Priority Data

Sep. 30, 2015    (AU) ................................. 2015903990

(51) Int. Cl.
*H01M 50/502*    (2021.01)
*H02J 7/00*    (2006.01)
(Continued)

(52) U.S. Cl.
CPC ......... *H02J 7/0024* (2013.01); *H01M 10/425* (2013.01); *H01M 10/441* (2013.01);
(Continued)

(58) Field of Classification Search
CPC ...... H01M 10/441; H01M 2/34; H01M 2/305; H01M 2/1077; H01M 10/443;
(Continued)

(56) References Cited

U.S. PATENT DOCUMENTS 3,923,116 A    12/1975    Thomspon et al.
6,043,628 A    3/2000    Perelle et al.
(Continued)

FOREIGN PATENT DOCUMENTS

EP    1273372 B1    2/2009
WO    2014/012794 A1    1/2014

OTHER PUBLICATIONS

Supplementary European Search Report from corresponding EP Application No. EP16849956; dated May 8, 2019, pp. 1-8.
(Continued)

*Primary Examiner* — Gary D Harris
(74) *Attorney, Agent, or Firm* — Studebaker & Brackett PC

(57) ABSTRACT

Circuit module for coupling a plurality of battery cell units. The circuit module includes a first set of terminals having a positive terminal and a negative terminal for coupling to a first battery cell unit, and a second set of terminals having a positive terminal and a negative terminal for coupling to a second battery cell unit. The positive terminal of the first set of terminals is coupled to the negative terminal of the second set of terminals either directly or via one or more passive components, and the negative terminal of the first set of terminals and the positive terminal of the second set of terminals each is coupled to a switching assembly. The switching assembly is operatively configured to selectively connect or bypass each one of the battery cell units. The invention is also directed to a battery system including the circuit module and a plurality of battery cell units.

20 Claims, 8 Drawing Sheets

(51) Int. Cl.
　　　*H01M 10/42* 　　(2006.01)
　　　*H01M 10/44* 　　(2006.01)
　　　*H01M 10/48* 　　(2006.01)
(52) U.S. Cl.
　　　CPC ....... *H01M 10/443* (2013.01); *H01M 10/482* (2013.01); *H01M 10/486* (2013.01); *H01M 50/502* (2021.01); *H02J 7/0047* (2013.01); *H01M 2010/4271* (2013.01)
(58) Field of Classification Search
　　　CPC ........... H01M 10/425; H01M 2220/20; H01M 2010/4271; H01M 6/00; B60L 2240/549; B60L 2240/547; B60L 2240/545; B60L 50/66; B60L 50/64; B60L 58/22; B60L 3/0046; Y02T 10/7061; Y02T 10/7005; B60Y 2200/90; B60K 6/28
　　　USPC ......................................................... 429/62
　　　See application file for complete search history.

(56) References Cited

U.S. PATENT DOCUMENTS

| | | | |
|---|---|---|---|
| 6,140,799 | A | 10/2000 | Thomasson |
| 6,430,692 | B1 | 8/2002 | Kimble et al. |
| 8,816,613 | B2 | 8/2014 | Lee |
| 2004/0164706 | A1 | 8/2004 | Osborne |
| 2007/0062744 | A1 | 3/2007 | Weidenheimer et al. |
| 2007/0275593 | A1 | 11/2007 | Barwick |
| 2009/0128158 | A1 | 5/2009 | Kawai |
| 2010/0261047 | A1 | 10/2010 | Kim et al. |
| 2012/0091802 | A1 | 4/2012 | Adelson et al. |
| 2012/0091964 | A1 | 4/2012 | Vance et al. |
| 2014/0015488 | A1* | 1/2014 | Despesse ................ B60L 58/12 320/122 |
| 2016/0336623 | A1 | 11/2016 | Nayar et al. |

OTHER PUBLICATIONS

International Search Report dated Nov. 7, 2016, in International Application No. PCT/AU2016/050917, filed Sep. 29, 2016, in 4 pages.

International Preliminary Report on Patentability dated Dec. 20, 2017 in International Application No. PCT/AU2016/050917, filed Sep. 29, 2016, in 50 pages.

International-Type Search Report dated Nov. 24, 2017 for related Australian Application No. 2017900386, filed Feb. 8, 2017, in 9 pages.

* cited by examiner

BATTERY SYSTEM

TECHNICAL FIELD

The invention described herein generally relates to energy storage systems such as battery systems.

BACKGROUND ART

Energy storage systems for applications such as full electric vehicles, hybrid electric vehicles, and stationary energy storage in grid connected or off grid applications, frequently include an arrangement of multiple energy storage cell units. Each cell unit is limited by its functional mechanism and design to provide an output voltage within a certain range depending on its state of charge and operating conditions. Each cell unit is also limited by its functional mechanism and design to provide a certain maximum charge storage capability, depending on the operating conditions. Electrically connecting cell units in series increases the maximum achievable output voltage, therefore decreasing the magnitude of current required to supply a given power output. This increases the system efficiency as ohmic losses increase with current magnitude. Electrically connecting cell units in parallel increases the maximum achievable storage capacity for a given cell unit capacity and storage system output voltage level.

The individual cell units inevitably display some differences in terms of charge storage capacity, internal resistance, and other performance related factors. Even before entering their operating life, cell units inevitably have differences caused by manufacturing tolerances that allow for certain variations in cell units during manufacturing with even the most advanced state of the art manufacturing processes. Throughout the operating life, variations in cell unit performance degradation conditions or profiles further contribute to these differences. In applications in which used cell units are recycled for re-use, the cell units can be associated with notable performance differences, particularly if the cell units have been exposed to different usage profiles. Utilising cell units with different specifications can also contribute to cell unit differences.

In energy storage systems that include multiple energy storage units, such differences between cell units can impact how the overall energy storage system is managed and performs. In cell units that are electrically connected in parallel, lower performing cell units contribute or accept a lower current during a discharge or charge process, respectively. This leads to higher performing cell units contributing to or accept a higher current during a discharge or charge process, respectively. Such rate increases can decrease the system efficiency, increase cell unit degradation, and potentially present safety risks. It is therefore often necessary to constrain the entire system to a lower power input or output level. In cell units that are electrically connected in series, lower charge capacity cell units can contribute or accept less electric charge during a discharge or charge process, respectively. Due to the series arrangement, higher charge capacity cell units are limited to contribute only an equal amount of charge as the lowest charge capacity cell unit. This means that the cell unit with the lowest charge capacity limits the charge storage capacity of the full energy storage system.

Conventional battery management systems typically use switched resistors to dissipate surplus energy from higher charged cell units, or switched capacitors or switched inductors to transfer energy from higher charged cell units to lower charged cell units. The primary role of these systems is to equalise the state of charge differences of cell units connected in series at a particular point in the charge discharge cycles, for example at the end of charging. Equalising the state of charge at one specific point in the cycle ensures that the lowest capacity cell unit in a series arrangement is able to be fully used. It does not, however, allow higher capacity cell units to contribute more energy to the output.

For example, assume two fully charged battery cell units connected in a series arrangement have capacities for 1 Ah and 10 Ah, respectively. If this system discharges at a rate of 1 A then, assuming no equalisation during the discharge, the entire system has a discharge time of one hour during which it will provide 2 Ah consisting of 1 Ah from the lower capacity cell unit and 1 Ah from the higher capacity cell unit.

In order to overcome the limitations posed by the lowest capacity cell unit in an energy storage system comprising multiple cell units connected in series, a more advanced approach is required. Switched capacitor or switched inductor balancing systems can be operated to transfer energy on a continuous basis, for example transferring energy from higher charge capacity cell units to lower charge capacity cell units throughout part or all of the discharge process. However, the electrical pathways and components used to equalise the cell units are typically rated to energy throughputs that are only a fraction of the rating of the full energy storage system. As such, the systems typically can only account for a fraction of the difference between the cell units.

For example, assume two fully charged battery cell units connected in a series arrangement have capacities for 1 Ah and 10 Ah, respectively. If this system discharges at a rate of 1 A and additionally transfer energy from the lower charged cell unit to the higher charged cell unit at a rate of 0.1 A, then after one hour, the system has provided a capacity of 2 Ah. At this point, due to the energy transfer, the lower charge capacity cell unit still holds 0.1 Ah and the higher charge capacity cell unit still holds 8.9 Ah, allowing discharging to be continued for approximately 0.1 hours longer and resulting in a full energy storage system capacity that is around 0.2 Ah larger than without any equalisation system. The additional discharge time and energy that can be maintained from higher charge capacity cell units increases with the energy rating of the equalisation system, which can increase the cost and space requirements among other factors. This leads such battery management approaches to predominantly be useful for energy storage systems with relatively small differences only, such as energy storage systems based on not previously used cell units with the same specifications. Furthermore, using switched capacitors or switched inductors requires energy to be transferred via intermediary storage devices such as capacitors or inductors, respectively, which can be associated with losses that negatively impact the full energy storage system efficiency.

A further method to address the limitations posed by differences between cell units that are connected in series is to use voltage converters. Typically, each cell unit is connected to one voltage converter, and the voltage converters are connected in parallel leading to a coupling on the direct current side. This can then be either directly or via a further voltage converter connected to an inverter. Another option is to connect each cell unit to one voltage converter, and connect each voltage converter to an inverter and connect the inverters in parallel so that the energy from the cell units is connected on the alternating current side. A further option is to use voltage converters with the output connected in series. Disadvantages of using voltage converters include the considerable component cost of converters, some prospective limitations in controllability of cell charging and discharging depending on controller type and layout, and the limited efficiency of voltage converters, partly due to energy losses in storage elements used for voltage conversion such as inductors and/or capacitors.

Switches can also be used to connect or bypass the cell units. By bypassing lower-performing cell units, additional charge and discharge capacity can be unlocked from the other cell units. Some disadvantages of current systems using this approach are that for each cell unit connected in series, an additional switch is placed in any given current path contributing an associated on resistance and energy loss.

It is an aim of the invention to provide a battery system which overcomes or ameliorates one or more of the disadvantages or problems described above, or which at least provides the consumer with a useful choice.

SUMMARY OF THE INVENTION

According to one aspect of the invention, there is provided a circuit module for coupling a plurality of battery cell units, the circuit module including a first set of terminals having a positive terminal and a negative terminal for coupling to a first battery cell unit, a second set of terminals having a positive terminal and a negative terminal for coupling to a second battery cell unit, a third set of terminals having a positive terminal and a negative terminal for coupling to a third battery cell unit, and a fourth set of terminals having a positive terminal and a negative terminal for coupling to a fourth battery cell unit, the positive terminal of the first set of terminals being coupled to the negative terminal of the second set of terminals either directly or via one or more passive components, the positive terminal of the third set of terminals being coupled to the negative terminal of the fourth set of terminals either directly or via one or more passive components, the negative terminal of the first set of terminals, the positive terminal of the second set of terminals, at least one of the terminals of the third set of terminals and at least one of the terminals of the fourth set of terminals each being coupled to a switching assembly, and wherein the switching assemblies are operatively configured to selectively connect or disconnect each one of the battery cell units, each switching assembly including one or more switching devices, each switching device operable in a conductive state and a non-conductive state, wherein the switching assemblies are operatively configured to selectively allow operating in a plurality of states in which any two or more battery cell units are connected in series, each state including a charging cycle and a discharging cycle of the battery cell units connected in series, the plurality of states including a first state in which the first battery cell unit and the second battery cell unit are electrically connected in series and the third battery cell unit is disconnected, a second state in which the first battery cell unit and the third battery cell unit are electrically connected in series and the second battery cell unit is disconnected, a third state in which the second battery cell unit and the third battery cell unit are electrically connected in series and the first battery cell unit is disconnected, a fourth state in which the first battery cell unit, the second battery cell unit and the fourth battery cell unit are electrically connected in series and the third battery cell unit is disconnected, and a fifth state in which the first battery cell unit, the second battery cell unit, the third battery cell unit and the fourth battery cell unit are electrically connected in series; and the first battery cell unit, the second battery cell unit, the third battery cell unit and the fourth battery cell unit are adjacently positioned to one another such that the fifth state is achieved via a connection path having a minimum number of conducting switching devices within the circuit module, and wherein when the second battery cell unit and the third battery cell unit are connected in series, a series connection path between the second battery cell unit and the third battery cell unit includes a maximum of two switching devices operating in the conductive state.

Therefore, the positive terminal of the first set of terminals may be directly coupled to the negative terminal of the second set of terminals, or the positive terminal of the first set of terminals may be coupled to the negative terminal of the second set of terminals via one or more passive components such as conductors, fuses, resistors, inductors or any other like components. In the present specification, passive components refer to any circuitry component such as conductors, fuses, resistors, inductors or any other like that operates in a non-switching manner.

In practice, arranging the circuit in such a way that the positive terminal of the first set of terminals are directly coupled or coupled via passive component(s) to the negative terminal of the second set of terminals may advantageously allow all of the switching assemblies to be located on a single side of the circuit module, thereby greatly simplifying the configuration of the circuit module. In a battery system incorporating such a circuit module, this allows all circuitry components, (e.g. PCB circuit boards and the like carrying the switching assemblies) to be located on a single side of the terminal sets (e.g. a single side of the battery cell units once coupled to the circuit module). In this manner, the overall number of circuit components can be minimised and the arrangement or configuration of the circuit components can be simplified, thus reducing impedance and losses in the overall battery system, and also reducing manufacturing time and costs. Moreover, the overall weight and size of the battery system can be minimised. This can be advantageous particularly in applications where space and weight restrictions apply.

In some embodiments, the switching assemblies are operatively configured to selectively allow operating in a plurality of connection modes, the plurality of connection modes including a first connection mode in which a series-connection of two or more battery cell units connect to the battery system output in a first electrical polarity, and a second connection mode in which a series-connection of two or more battery cell units connect to the battery system output in a second polarity that differs from the electrical polarity of the first electrical polarity.

In some embodiments, each switching assembly includes a first switching device for connecting an associated battery cell unit, and a second switching device for disconnecting the associated battery cell unit.

In some embodiments, the switching assemblies include one or more transistors.

In some embodiments, the switching assemblies can be operatively configured to selectively connect or disconnect any one or more of the battery cell units so as to vary a total voltage output from the plurality of battery cell units.

According to another aspect of the invention, there is provided a battery system which includes one or more aforementioned circuit modules and a plurality of battery cell units coupled to the circuit module.

In some embodiments, the battery system further includes a battery mount configured to allow one or more battery cell units to be mounted for coupling to the circuit module, wherein all switching assemblies of the circuit module are located to one side of the battery mount.

In some embodiments, the battery system further includes a controller for controlling the switching assemblies of the circuit module.

In some embodiments, the controller controls the switching assemblies based on the charge and discharge behaviour of the battery cell units.

In some embodiments, wherein the controller determines the charge and discharge behaviour of each battery cell unit based on the voltage, current and/or temperature of the battery cell unit during charging and/or discharging.

In some embodiments, the controller:
compares a measured voltage, current and/or temperature of the battery cell unit with predetermined voltage, current and/or temperature ranges,
determines the battery cell units to connect and/or bypass, and
controls the switching assemblies to connect or bypass each battery cell unit.

Moreover, the controller may operate the switching assemblies at high frequency.

In some embodiments, in any switching state of the switching assemblies, at most one switching device is conducting in a current path between adjacent battery cell units during operation of the circuit module.

In some embodiments, in any switching state of the switching assemblies, at most one switching device is conducting in a current path between non-adjacent battery cell units during operation of the circuit module.

In some embodiments, in any switching state of the switching assemblies, the ratio of conducting switching devices to battery cell units is less than one during operation of the circuit module.

In some embodiments, when all of the battery cell units are connected to the circuit module, the ratio of closed switches to battery cell units is less than one.

In some embodiments, the switching assemblies include one or more electromechanical relays as switching devices.

In some embodiments, the switching assemblies can be operatively configured to selectively connect any one or more battery cell units to the circuit module without altering the polarity of the connected battery cell units.

In some embodiments, the battery cell units are used battery cell units. In particular, the battery cell units may have had previous use as batteries for hybrid-electric or pure electric vehicles.

In one application, the circuit module may be used for repurposing used vehicle batteries. In particular, used vehicle batteries may be coupled in series in the circuit module to provide a battery system for electrical energy storage. The battery system may provide electrical energy storage for residential or commercial use.

Reducing the number of closed switches in the current path between active battery cell units advantageously reduces losses due to switching resistance, thereby improving the overall performance of the battery system.

Each switching assembly may include a first switch for connecting an associated battery cell unit, and a second switch for bypassing the associated battery cell unit.

In one embodiment, for the first set of terminals, the first switch of the associated switching assembly is coupled to the negative terminal of the first set of terminals on one side, and the second switch on a second side; and the second switch of the associated switching assembly is coupled to the first switch on one side, and the positive terminal of the first set of terminals on a second side. In this embodiment, for the second set of terminals, the first switch of the associated switching assembly is coupled to the positive terminal of the second set of terminals on one side, and the second switch on a second side; and the second switch of the associated switching assembly is coupled to the first switch on one side, and the negative terminal of the second set of terminals on a second side.

The first and second set of terminals along with their associated switching assemblies may form one unit of the circuit module. The circuit module may include a plurality of units coupled together.

Any suitable switching devices may be used. In some embodiments, the switching assemblies may include one or more electromechanical relays. The switching assemblies may include one or more transistors.

According to another aspect of the invention, there is provided a circuit module for coupling a plurality of battery cell units, the circuit module including: a first set of terminals having a positive terminal and a negative terminal for coupling to a first battery cell unit, a second set of terminals having a positive terminal and a negative terminal for coupling to a second battery cell unit, a third set of terminals having a positive terminal and a negative terminal for coupling to a third battery cell unit, and a fourth set of terminals having a positive terminal and a negative terminal for coupling to a fourth battery cell unit, a fifth set of terminals having a positive terminal and a negative terminal for coupling to a fifth battery cell unit, the positive terminal of the first set of terminals being coupled to the negative terminal of the second set of terminals either directly or via one or more passive components, the positive terminal of the third set of terminals being coupled to the negative terminal of the fourth set of terminals either directly or via one or more passive components, the positive terminal of the fourth set of terminals being coupled to the negative terminal of the fifth set of terminals either directly or via one or more passive components, the negative terminal of the first set of terminals, the positive terminal of the second set of terminals, at least one of the terminals of the third set of terminals, at least one of the terminals of the fourth set of terminals, and at least one of the fifth set of terminals each being coupled to a switching assembly, and wherein the switching assemblies are operatively configured to selectively connect or disconnect each one of the battery cell units, each switching assembly including one or more switching devices, each switching device operable in a conductive state and a non-conductive state, wherein the switching assemblies are operatively configured to selectively allow operating in a plurality of states in which any two or more battery cell units are connected in series, each state including a charging cycle and a discharging cycle of the battery cell units connected in series, the plurality of states including a first state in which the first battery cell unit and the second battery cell unit are electrically connected in series and the third battery cell unit is disconnected, a second state in which the first battery cell unit and the third battery cell unit are electrically connected in series and the second battery cell unit is disconnected, a third state in which the second battery cell unit and the third battery cell unit are electrically connected in series and the first battery cell unit is disconnected, a fourth state in which the first battery cell unit, the second battery cell unit and the fourth battery cell unit are electrically connected in series and the third battery cell unit is disconnected, a fifth state in which the first battery cell unit, the second battery cell unit, the third battery cell unit, the fourth battery cell unit and the fifth battery cell unit are electrically connected in series, and a sixth state in which the first battery cell unit, the second battery cell unit, the fourth battery cell unit and the fifth battery cell unit are electrically connected in series, and the third battery cell unit is disconnected.

In some embodiments, each switching assembly includes a first switching device for connecting an associated battery cell unit, and a second switching device for disconnecting the associated battery cell unit.

In some embodiments, the switching assemblies include one or more transistors.

In some embodiments, the switching assemblies can be operatively configured to selectively connect or disconnect any one or more of the battery cell units so as to vary a total voltage output from the plurality of battery cell units.

According to another aspect of the invention, there is provided a battery system which includes one or more of the aforementioned circuit modules, and a plurality of battery cell units coupled to the circuit module.

In some embodiments, the battery system further includes a battery mount configured to allow one or more battery cell units to be mounted for coupling to the circuit module, wherein all switching assemblies of the circuit module are located to one side of the battery mount.

In some embodiments, the battery system further includes including a controller for controlling the switching assemblies of the circuit module.

In some embodiments, the controller controls the switching assemblies based on the charge and discharge behaviour of the battery cell units.

In some embodiments, the controller determines the charge and discharge behaviour of each battery cell unit based on the voltage, current and/or temperature of the battery cell unit during charging and/or discharging.

In some embodiments, the controller
  compares a measured voltage, current and/or temperature of the battery cell unit with predetermined voltage, current and/or temperature ranges,
  determines the battery cell units to connect and/or bypass, and
  controls the switching assemblies to connect or bypass each battery cell unit.

Moreover, the controller may operate the switching assemblies at high frequency.

In some embodiments, in any switching state of the switching assemblies, at most one switching device is conducting in a current path between adjacent battery cell units during operation of the circuit module.

In some embodiments, in any switching state of the switching assemblies, at most one switching device is conducting in a current path between non-adjacent battery cell units during operation of the circuit module.

In some embodiments, in any switching state of the switching assemblies, the ratio of conducting switching devices to battery cell units is less than one during operation of the circuit module.

In some embodiments, when all of the battery cell units are connected to the circuit module, the ratio of closed switches to battery cell units is less than one.

In some embodiments, the switching assemblies include one or more electromechanical relays as switching devices.

In some embodiments, the switching assemblies can be operatively configured to selectively connect any one or more battery cell units to the circuit module without altering the polarity of the connected battery cell units.

In some embodiments, the battery cell units are used battery cell units. In particular, the battery cell units may have had previous use as batteries for hybrid-electric or pure electric vehicles.

In one application, the circuit module may be used for repurposing used vehicle batteries. In particular, used vehicle batteries may be coupled in series in the circuit module to provide a battery system for electrical energy storage. The battery system may provide electrical energy storage for residential or commercial use.

In some embodiments, the plurality of battery cell units can comprise a combination of individual battery cell units and blocks of parallel connected cells. In this specification, the terms "battery cell unit" or "cell unit" can refer to an individual battery cell or a block of cells connected in parallel, and similar reasoning applies to variations of those terms, such as plurals. It can also refer to a block of cells connected in parallel in which one or more circuit components such as fuses, resistors or inductors are connected in series and/or parallel with individual cells.

The battery cell units can be any suitable energy storage elements including for example, supercapacitors, and the like.

In this specification, the term "switch" refers to one or a plurality of circuit elements that can be controlled in a way that changes the path of current flow. In some embodiments, a switch comprises of one or a plurality of electromechanical relays. In some other embodiments, a switch comprises of one or a plurality of transistors.

In order that the invention may be more readily understood and put into practice, one or more preferred embodiments thereof will now be described, by way of example only, with reference to the accompanying drawings.

DETAILED DESCRIPTION OF PREFERRED EMBODIMENT(S)

Figure 1:
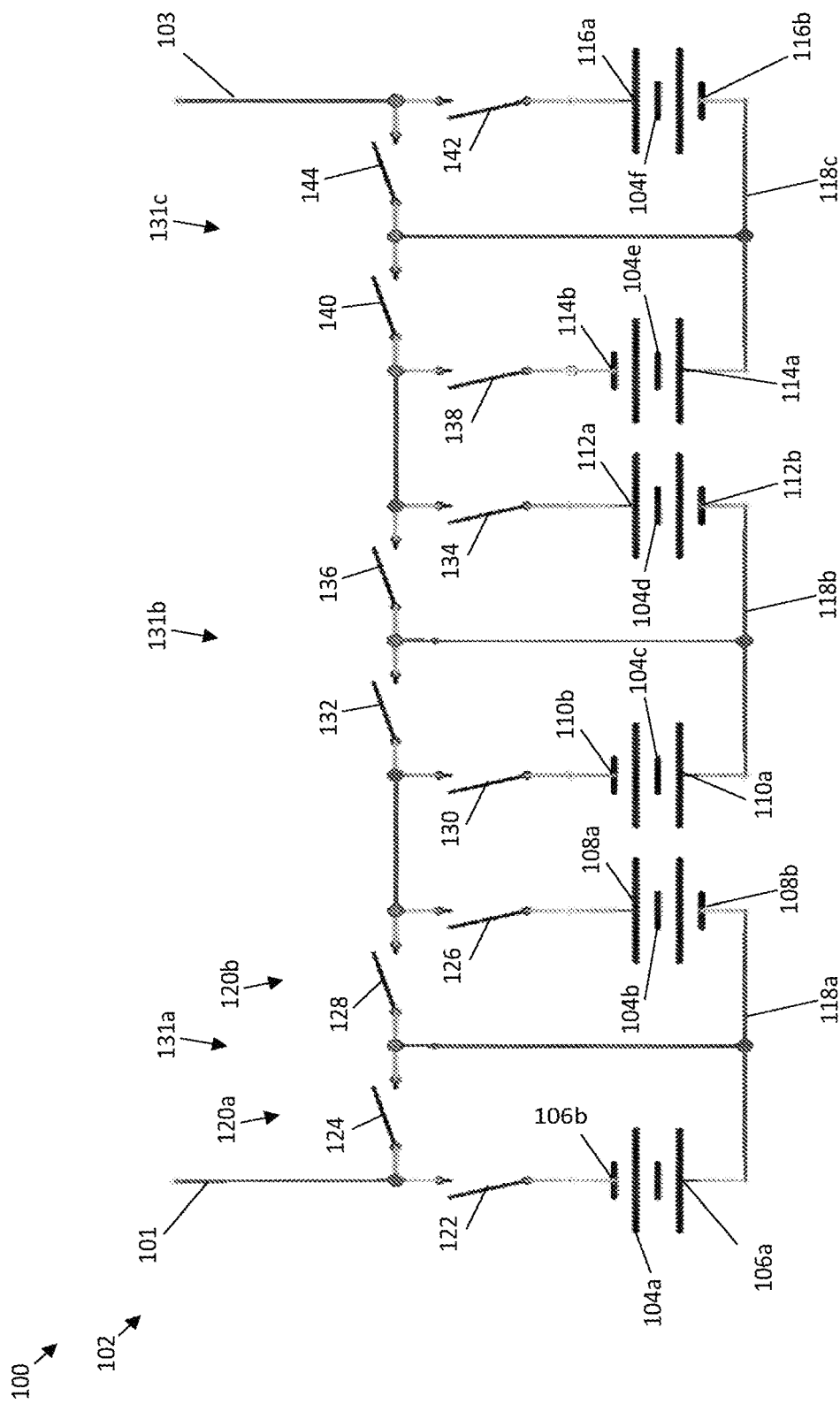
FIG. 1 is a circuit diagram of a battery system according to one embodiment of the invention.

A battery system 100 according to one embodiment of the invention is shown in FIG. 1. The battery system 100 includes a circuit module 102 for coupling to a plurality of battery cell units 104. For exemplary purpose, the battery system 100 includes six battery cell units 104a, 104b, 104c, 104d, 104e, 104f. However, any suitable number of battery cell units 104 may be used in the battery system 100. The battery system 100 includes battery pack terminals 101 and 103 for providing electrical energy to an external load or receiving electrical energy from an external supply (not shown).

The circuit module 102 includes six sets of terminals 106-116 for coupling with the battery cell units 104, each terminal set having a positive terminal 106*a*, 108*a*, 110*a*, 112*a*, 114*a*, 116*a*, and a corresponding negative terminal 106*b*, 108*b*, 110*b*, 112*b*, 114*b*, 116*b*. Each terminal set 106-116 is configured for coupling to a battery cell unit 104 (herein referred to as an associated battery cell unit 104). However, a person skilled in the art would understand that any number of terminals and battery cell units may be used in the battery system 100 or any of the battery systems described herein without departing from the scope of the invention.

In the battery system 100, the components of circuit module 102 are arranged in such a way that a positive terminal of one set of terminals 106*a*, 110*a*, 114*a* is directly coupled to the negative terminal of an adjacent set of terminals 108*b*, 118*b*, 116*b* by a conductor 118*a*-118*c*.

The negative terminal 106*b* of a first set of terminals 106 is coupled to a switching assembly 120*a*. Switching assembly 120*a* includes a first switch 122 for connecting battery cell unit 104*a* to the circuit module 102 when closed, and a second switch 124 for bypassing battery cell unit 104*a* when closed. More particularly, battery cell unit 104*a* is active or connected to the circuit module 102 when the first switch 122 is closed and the second switch 124 is open, and the battery cell unit 104*a* is inactive or bypassed from the circuit module 102 when the first switch 122 is open and the second switch 124 is closed.

Similarly, the positive terminal 108*a* of a second set of terminals 108 is coupled to a second switching assembly 120*b*. Switching assembly 120*b* includes a first switch 126 for connecting battery cell unit 104*b* to the circuit module 102 when closed, and a second switch 128 for bypassing battery cell unit 104*b* when closed. More particularly, battery cell unit 104*b* is connected to the circuit module 102 when the first switch 126 is closed and the second switch 128 is open, and the battery cell unit 104*b* is bypassed from the circuit module 102 when the first switch 126 is open and the second switch 128 is closed.

Accordingly, current flowing through battery cell unit 104*a* is controlled via the switches 122, 124. If switch 122 is closed and switch 124 is open, then any current flowing between pack terminals 101, 103 flows through switch 122 and battery cell unit 104*a*. If switch 122 is open and switch 124 is closed, then any current flowing between pack terminals 101, 103 passes through switch 124, but does not pass through battery cell unit 104*a*. Other battery cell units 104*b*-104*f* are controlled in a similar fashion via their associated switch assemblies.

The circuit layout including the two sets of terminals 106, 108, and the associated switching assemblies 120*a*, 120*b* respectively forms a single circuit unit block 131*a* of the battery system 100. The battery system 100 includes a further two circuit unit blocks 131*b*, 131*c* which are arranged in the same manner as unit block 131*a*. The three circuit units 131*a*, 131*b*, 131*c* are coupled together to form the overall system 100. However, it is understood that the system 100 may include any suitable number of unit block 131 to meet energy storage requirements of the specific application at hand.

As described, the positive terminal 106*a* for battery cell unit 104*a* is directly connected to the negative terminal 108*b* for battery cell unit 104*b*. Arranging the circuit in this way allows switches 122, 124, 126, 128 to be located in close physical vicinity on one side of the battery cell units 104*a*, 104*b* without the need to extend the length of the current path length between battery cell units 104 and the switches 122, 124, 126, 128. This advantageously results in reduced manufacturing costs, decreases space requirements, and avoids additional resistance, and thus energy losses caused by increased current path length.

However, in the battery system 100, to connect the positive terminal 106*a* for battery cell unit 104*a* to the negative terminal 112*b* of 104*d* through battery cell units 104*b* and 104*c*, the current passes through two switches 126, 130. In this embodiment, if all six battery cell units 104*a*-104*f* are to carry current, then the current also must pass through switches 122, 126, 130, 134, 138 and 142. This corresponds to current passing through one switch per cell unit, each of which has an on resistance and associated energy loss.

Figure 2:
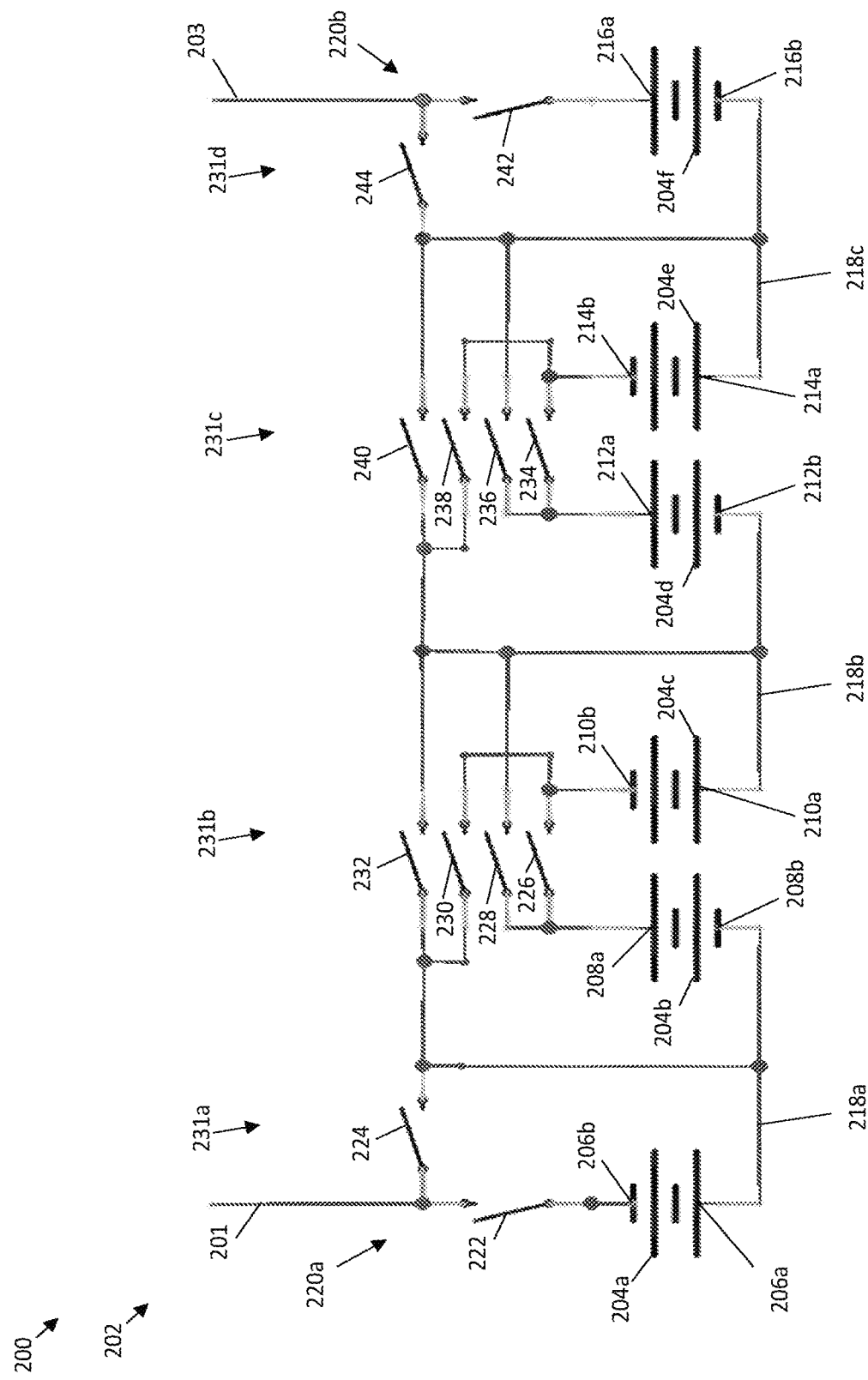
FIG. 2 is a circuit diagram of a battery system according to another embodiment of the invention.

The battery system 200 as shown in FIG. 2 further reduces the battery system on resistance and associated energy losses when all battery cell units 204 are connected to the circuit module 202 by reducing the total number of closed switches in the current path in this switching state as further explained below.

The battery system 200 includes circuit module 202 configured to receive six battery cell units 204*a*-204*f* coupled thereto. However, any suitable number of battery cell units 204 may be used in the battery system 200. The battery system 100 includes battery pack terminals 201 and 203 for providing electrical energy to an external load or receiving electrical energy from an external supply (not shown).

The circuit module 202 includes six sets of terminals 206-216 for coupling with the battery cell units 204, each terminal set having a positive terminal 206*a*, 208*a*, 210*a*, 212*a*, 214*a*, 216*a*, and a corresponding negative terminal 206*b*, 208*b*, 210*b*, 212*b*, 214*b*, 216*b*. Each terminal set 206-216 is configured for coupling to a battery cell unit 204.

In the battery system 200, the components of circuit module 202 are also arranged in such a way that a positive terminal of one set of terminals 206*a*, 210*a*, 214*a* is directly coupled to the negative terminal of an adjacent set of terminals 208*b*, 212*b*, 216*b* by a conductor 218*a*-218*c*.

The negative terminal 206*b* of a first set of terminals 206 is coupled to a switching assembly 220*a*. Switching assembly 220*a* includes a first switch 222 for connecting battery cell unit 204*a* to the circuit module 202 when closed, and a second switch 224 for bypassing battery cell unit 204*a* when closed. More particularly, battery cell unit 204*a* is connected to the circuit module 202 when the first switch 222 is closed and the second switch 224 is open, and the battery cell unit 204*a* is bypassed from the circuit module 202 when the first switch 222 is open and the second switch 224 is closed. The circuit layout including the set of terminals 206*a*, 206*b* and the switching assembly 220*a* forms a first end circuit unit block 231*a*.

Similarly, on an opposite end of the circuit module 202, the positive terminal 216*a* of terminal set 216 is coupled to switching assembly 220*b*. In a similar manner to switching assembly 220*a*, switching assembly 220*b* includes a first switch 242 for connecting battery cell unit 204*f* to the circuit module 202 when closed, and a second switch 244 for bypassing battery cell unit 204*f* when closed. The circuit layout including the set of terminals 216*a*, 216*b* and the switching assembly 220*b* forms a second end circuit unit block 231*d*.

Two further circuit unit blocks 231*b*, 231*c* are coupled between the end unit blocks 231*a*, 231*d*. For unit block 231b, the positive terminal 208a for battery cell unit 204b and the negative terminal 210b for battery cell unit 204c is coupled to a switching assembly comprising switches 226, 228, 230, 232. In particular, the positive terminal 208a for cell unit 204b is connected to one side of switches 226 and 228; the negative terminal 208b is connected to one side of switches 230 and 232; the negative terminal 210b for cell 204c is connected to the other side of switches 226 and 230; and the positive terminal 210a is connected to the other side of switches 228 and 232, Battery cell units 204b and 204c can be each connected and/or bypassed according to the switching states for switches 226-232 as shown in the table below.

| Cell unit 204b | Cell unit 204c | Switch 226 | Switch 228 | Switch 230 | Switch 232 |
|---|---|---|---|---|---|
| Connected/Active | Connected/Active | Closed | Open | Open | Open |
| Connected/Active | Bypassed/Inactive | Open | Closed | Open | Open |
| Bypassed/Inactive | Connected/Active | Open | Open | Closed | Open |
| Bypassed/Inactive | Bypassed/Inactive | Open | Open | Open | Closed |

Battery cell units 204b and 204c are both connected to the circuit module 202 when switch 226 is closed and switches 228, 230 and 232 are open; cell unit 204b is connected to and cell unit 204c is bypassed from the circuit module 202 when switch 228 is closed and switches 226, 230 and 232 are open; cell unit 204b is bypassed from and cell unit 204c is connected to the circuit module 202 when switch 230 is closed and switches 226, 228 and 232 are open; and cell units 204b and 204c are both bypassed from the circuit module 202 when switch 232 is closed and switches 226, 228 and 230 are open. Circuit unit block 231c operates in the same manner as circuit unit blocks 231b.

To reduce the total number of cell units 204 in battery system 200, one or more intermediate circuit unit blocks 231b, 231c can be removed or added to the circuit between end unit blocks 231a, 231b.

In battery system 200, the switches 222-244 are arranged in such a way that for at least one switching state, a battery cell unit 204 can be coupled to an adjacent battery cell unit 204 with at most one closed switch in the current path connecting the two adjacent battery cell units 204. In addition, the system 200 allows a battery cell unit to be coupled to an adjacent or non-adjacent cell unit 204 with at most one closed switch in the current path. For example, battery cell unit 204a can be coupled to adjacent battery cell unit 204b via conductor 218a and no switches; battery cell unit 204a can be coupled directly to non-adjacent battery cell unit 204c via conductors and a single closed switch 230; battery cell unit 204a can be coupled directly to non-adjacent battery cell unit 204d via conductors and a single closed switch 232. This configuration of circuit components advantageously reduces the total number of switches in the current path during operation to thereby reduce the ohmic energy losses due to on resistance of switches, and increasing the energy efficiency of the overall battery system 200.

Accordingly, to connect the positive terminal 206a for battery cell unit 204a to the negative terminal 212b of battery cell unit 204d, whilst connecting intermediate battery cell units 204b and 204c, the current only needs to pass through a single switch 226. In this battery system 200, when all six battery cell units 204a-204f are to carry current, only four switches 222, 226, 234 and 242 are closed and all other switches are open. In this switching state, as the current only flows through four switches 222, 226, 234 and 242, a switch to active battery cell unit ratio of less than one is achieved. Battery system 200 therefore decreases switch associated energy loss.

Similar to FIG. 1, the system 200 of FIG. 2 can also a plurality of switches to be located in close vicinity to one another and on a single side of the battery cell units 204, which in practice can decrease both manufacturing cost and space constraints.

Figure 3:
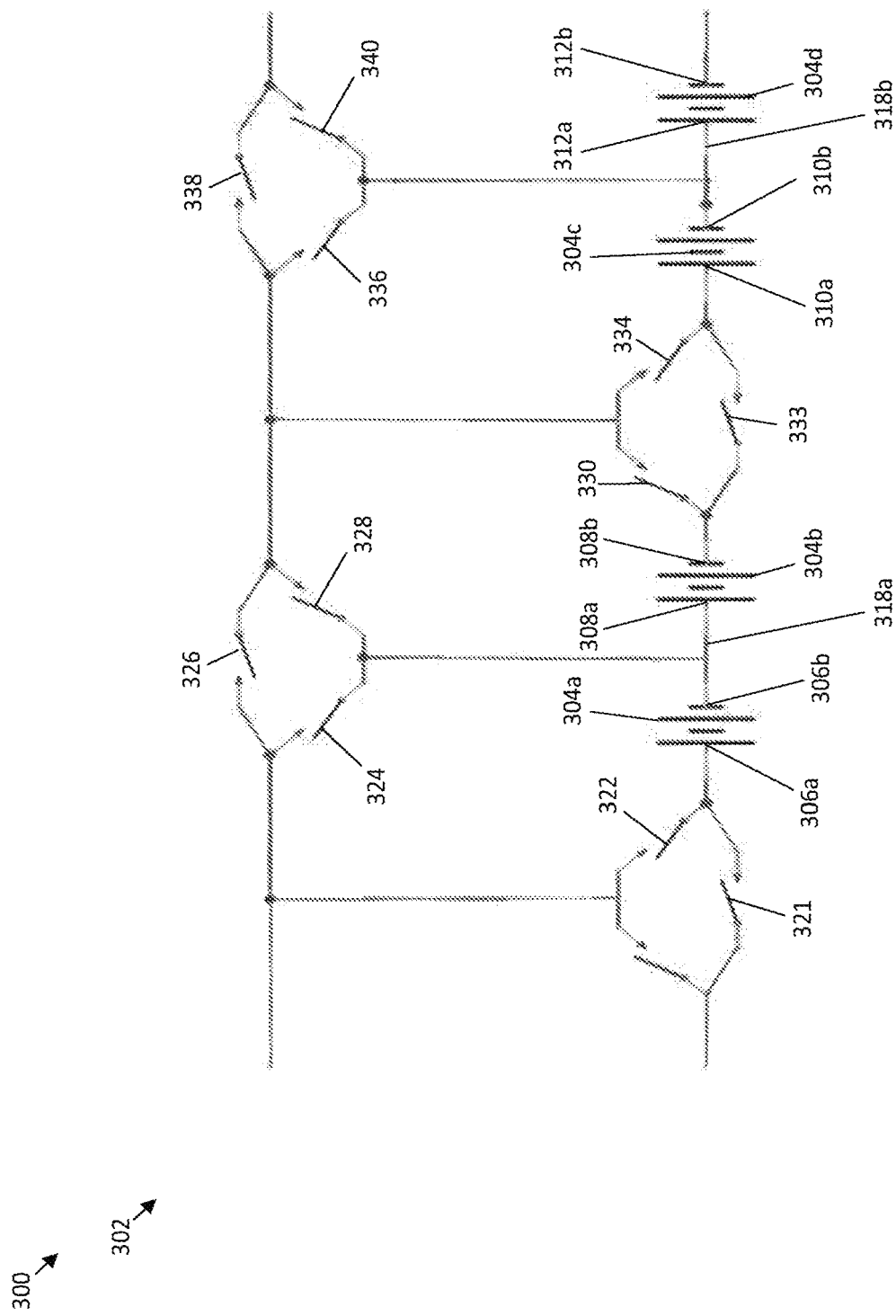
FIG. 3 is a circuit diagram of a battery system according to a further embodiment of the invention.

A battery system 300, portions of which can be repeated to form a larger battery system (not shown) is provided in FIG. 3. The battery system 300 includes circuit module 302 configured to receive four battery cell units 304a-304d coupled thereto.

The circuit module 302 includes four sets of terminals 306-312 for coupling with the battery cell units 304, each terminal set having a positive terminal 306a, 308a, 310a, 312a and a corresponding negative terminal 306b, 308b, 310b, 312b. Each terminal set 306-312 is configured for coupling to a battery cell unit 304.

In the battery system 300, the components of circuit module 302 are also arranged in such a way that a positive terminal of one set 308a, 312a is directly coupled to the negative terminal of an adjacent set of terminals 306b, 310b by a conductor 318a, 318b.

The positive terminal 306a of a first set of terminals 306 is coupled to a switching assembly comprising switches 322, 326. Battery cell unit 304a is connected to the circuit module 302 when switch 322 is closed and switch 324 is open, and the battery cell unit 304a is bypassed from the circuit module 302 when switch 322 is open and the second switch 324 is closed.

Similarly, the negative terminal 308b of a second set of terminals 308 is coupled to a second switching assembly comprising switches 328, 330. Battery cell unit 304b is connected to the circuit module 302 when switch 330 is closed and switch 328 is open, and battery cell unit 304b is bypassed from the circuit module 302 when switch 330 is open and the second switch 328 is closed. The switching assemblies associated with terminals 310 and 312 operate in a similar manner.

Accordingly, battery system 300 operates in a similar manner to battery system 100 of FIG. 1. Additional switch 326 is closed in the switching sequence that require both switches 324, 328 to be closed. Using a single switch 326 rather than two switches 324, 328 reduces losses created by switch resistance. Switches 321, 333, 338 serve a similar function to switch 326.

In system 300, when all cell units 304a-304d are connected into the current path, the current only flows two switches 321, 333. In this switching state, current passes through less than one switch per active battery cell unit 304, which also results in a switch to active battery cell unit ratio of less than one.

Figure 4:
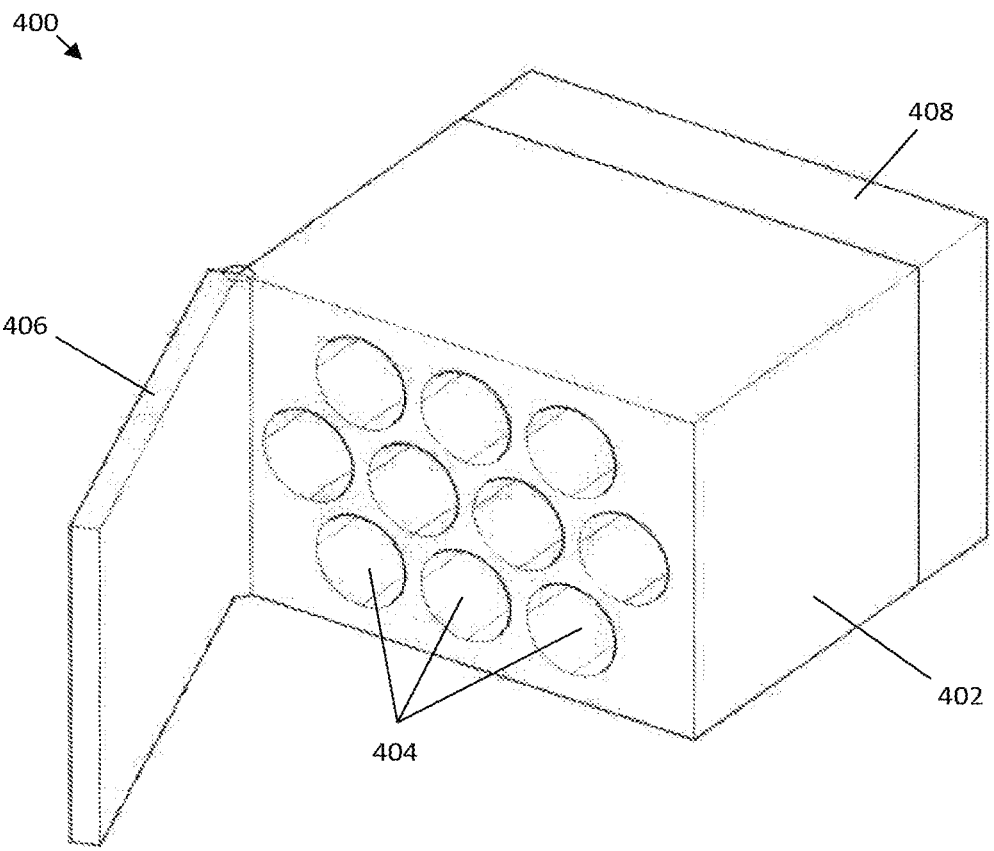
FIG. 4 is a perspective view of a housing of a battery system according to an embodiment of the invention.

A battery pack housing 400 for a battery system is shown in FIG. 4. The housing 400 provides a battery mount 402 mounting and dismounting individual battery cell units 104, 204, 304 for coupling to the circuit module 102, 202, 302. In particular, the battery mount 402 includes a plurality of enclosures 404, each enclosure being configured for receiving a battery cell unit 104, 204, 304 therein. The battery mount 402 allows the battery cell units 104, 204, 304 to be easily removable and replaceable.

The housing 400 includes a door 406 which includes conductors for coupling the battery cell units 104, 204, 304 to the circuit module 102, 202, 302. When the door 406 is open, for example for maintenance, the battery cell units 104, 204, 304 inside the housing 400 are disconnected. In a battery system comprising a number of battery packs each including a housing 400, the battery cell units 104, 204, 304 in any one of the housings 400 can be maintained via door 406 without affecting the operation of adjacent battery packs each having a separate housing 400.

Moreover, integrated circuit boards containing the switching assemblies are located on a single side 408 of the battery pack housing 400 for compactness, reduced losses due to conductor resistance, and manufacturing costs.

Figure 5:
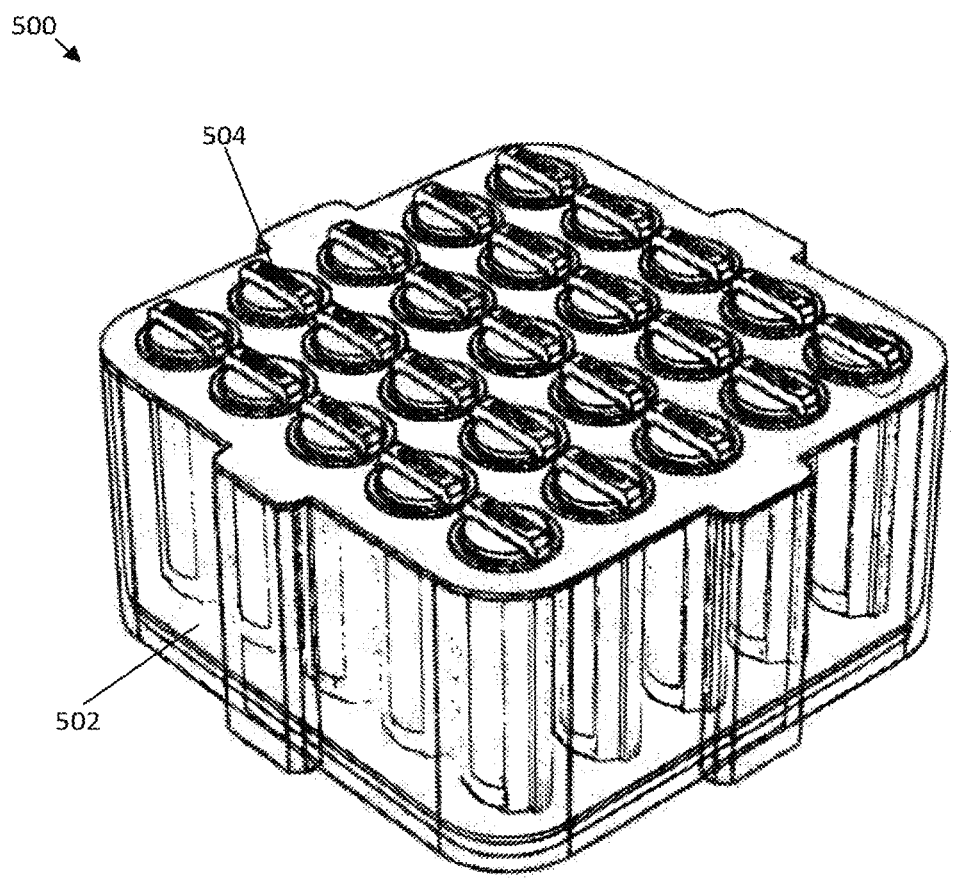
FIG. 5 is a perspective view of a battery pack of a battery system according to an embodiment of the invention.

An alternative battery pack 500 of a battery system is shown in FIG. 5. The battery pack 500 has a battery mount 502 similar to that shown in FIG. 4. However, the battery pack 500 housing provides each battery cell unit with its own individual connection interface 504 so that each individual battery cell unit 104, 204, 304 can be removed, replaced/maintained without disruption to the operation of the other connected battery cell units 104, 204, 304 in the battery pack 500.

A controller including a driving circuit is provided to determine the appropriate switching sequence of the switching assemblies described above. In some embodiments, the controller is a centralised controller to centrally control all switching assemblies. In other embodiments, the controller can include one or more decentralised controllers, each decentralised controller controlling a subset of the switching assemblies.

Figure 6:
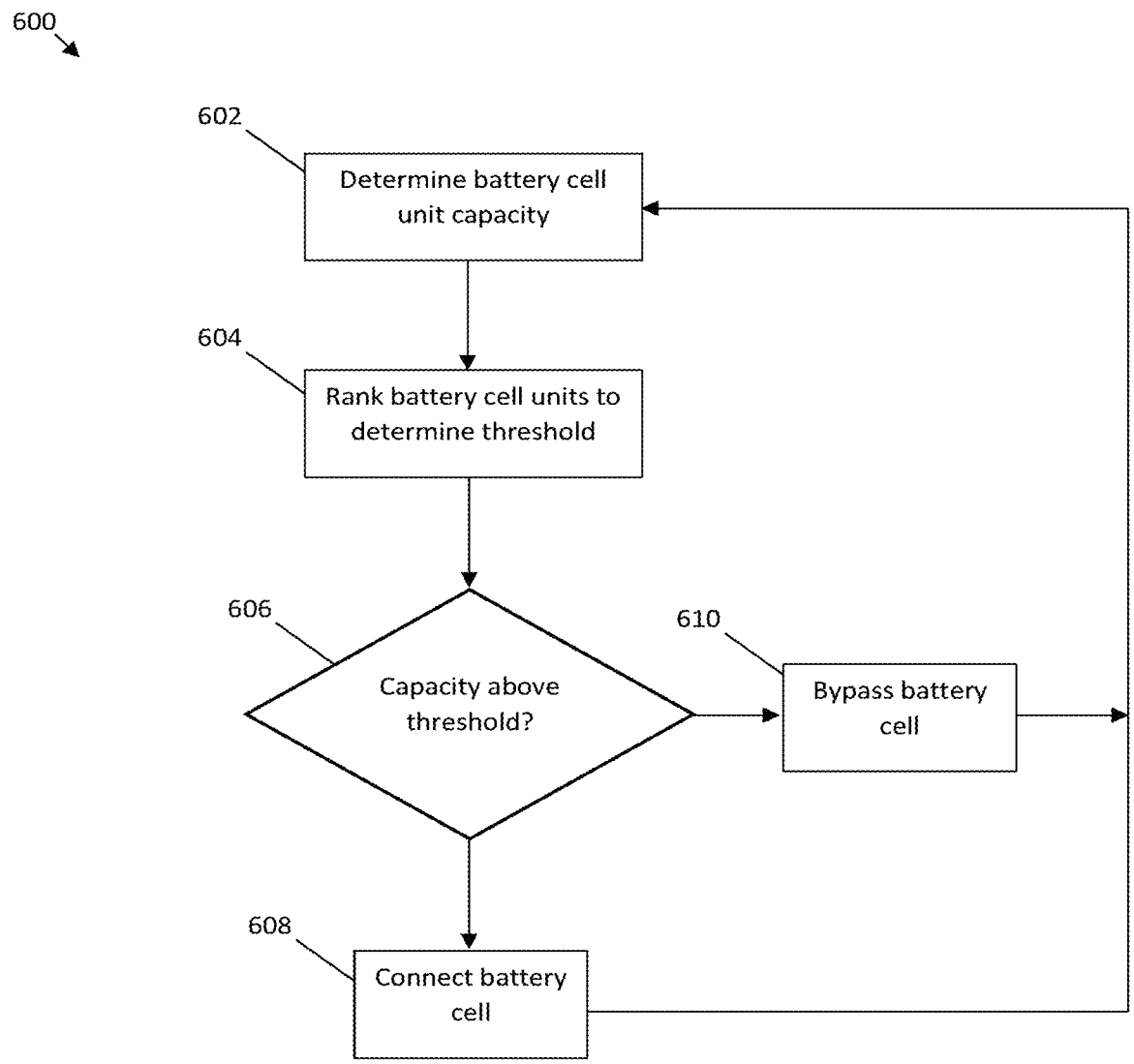
FIG. 6 is a flow diagram illustrating a method of controlling the switch assemblies of a battery system according to an embodiment of the invention.

Now turning to FIG. 6, a method 600 of controlling the switching assemblies is described.

At step 602, the charging and discharging capacity of each battery cell unit 104, 204, 304 is determined based on measurements of the battery voltage and/or battery current, thresholds for voltage and/or current, and/or historical battery measurement data.

At step 604, the controller ranks the capacity of each battery cell unit 104, 204, 304 from highest to lowest or vice versa, and determines a threshold capacity by halving the sum of the capacity for the cell unit with the highest capacity and the cell unit with the lowest capacity.

At query step 606, the controller determines whether the charging and discharging capacity of a given battery cell unit 104, 204, 304 is above or below the threshold determined in step 604. If the capacity of a particular battery cell unit 104, 204, 304 is above the threshold, the method 600 proceeds to step 608, and if not, the method 600 proceeds to step 610.

At step 608, the particular battery cell unit is made active or connected to the circuit module by opening and closing the appropriate switches in the associated switching assembly.

At step 610, the particular battery cell unit is made inactive or bypassed from the circuit module by opening and closing the appropriate switches in the associated switching assembly.

The method 100 is repeated until the battery cell units 104, 204, 304 which are connected to the respective circuit module 100, 200, 300 are fully charged or discharged.

In some embodiments, two or more threshold capacities can be determined and used based on the application requirements. For example, the controller may determine a lower threshold (calculated by multiplying the sum of the capacity for the cell unit with the highest capacity and the cell unit with the lowest capacity by $1/3$) and an upper threshold (calculated by multiplying the sum of the capacity for the cell unit with the highest capacity and the cell unit with the lowest capacity by $2/3$); and activate the battery cell units having a capacity below the lower threshold a third of the time, activate the battery cell units having a capacity above the lower threshold and below the upper threshold two thirds of the time, and activate the battery cell units having a capacity above the upper threshold on full time. This method can similarly be modified to have three or more thresholds, for example for battery packs having a larger number of battery cell units.

In some embodiments, the controller may monitor each battery cell unit 104, 204, 304 based on maintenance requirements to optimise battery system performance. This optimisation takes into account inputs regarding the battery cell unit behaviour, which can include current and/or past measurements of one or more voltages, currents, and/or temperatures, current and/or past computations of cell unit state of charge and/or state of health. It can also take into account inputs regarding battery maintenance requirements, which can include financial costs associated with battery maintenance, a schedule of when battery maintenance is next operationally feasible or advantageous.

In one scenario in which the next maintenance opportunity is some time away, this optimisation may reduce the utilisation and therefore the ageing of lower performing battery cell units to prolong their life until the next maintenance opportunity.

In a different scenario in which the next maintenance is impending, this optimisation may increase the utilisation of weaker battery cell units in order to maximise their utilisation before they get replaced as part of the maintenance.

In another embodiment, the controller carries out automated identification of battery cell unit characteristics. When using battery cell units with variations in performance, there is often value in identifying characteristics in order to provide inputs for battery cell unit usage optimisation. Existing state of the art methods require manual entering of battery data where battery cell units are labelled. This can be a time intense and/or error prone exercise. In one embodiment, automatic identification can be done by monitoring one or more battery cell units' charge and discharge behaviour including but not limited to measurements of voltage, current, and/or temperature. The system may then compare the observed behaviour to a database of information on cell unit types and/or chemistries. This database may provide characteristics that can include but are not limited to the battery chemistry, which may be linked to upper and/or lower voltage limits, current limits, temperature limits and/or ageing impacts of specific utilisation factors.

Figure 7:
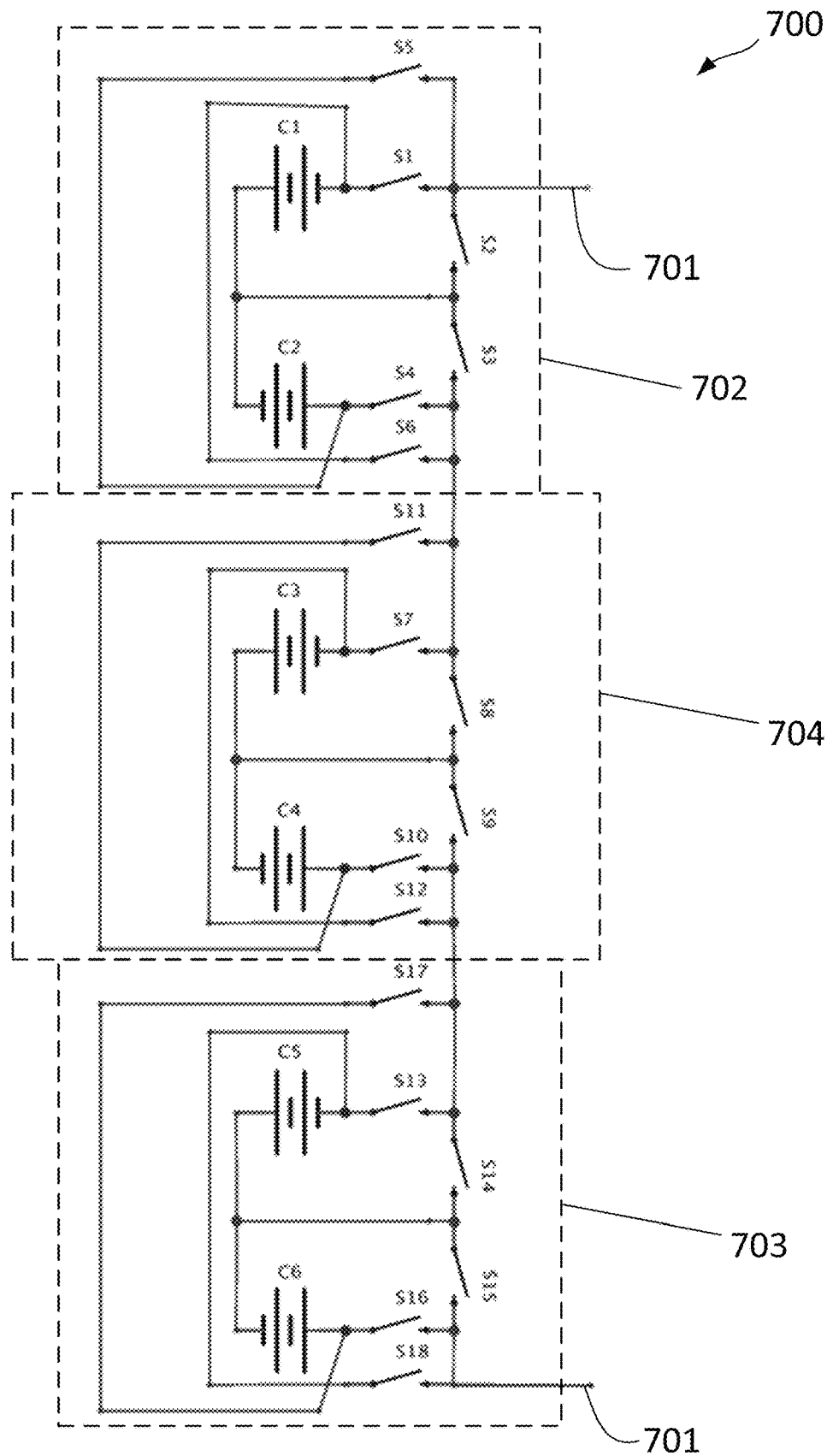
FIG. 7 is a circuit diagram of a battery system according to a further embodiment of the invention.

FIG. 7 shows another embodiment of a battery system 700 which enables combinations of cell units to be connected with either a negative or positive polarity. Advantages of this include the ability to generate both positive and negative voltages, including alternating current waveforms, without requiring additional conversion equipment at the battery system output such as a DC-AC converter or an h-bridge switching configuration. This may in turn reduce the system cost and efficiency losses in a battery system.

The exemplary depicted battery system 700 is a circuit module configured to receive six battery cell units C1-C6 coupled thereto. However, any suitable number of battery cell units may be used where one or more intermediate circuit unit blocks 704 can be removed or added to the circuit between the end unit blocks 702 and 703. The battery system 700 includes battery pack terminals 701 for providing electrical energy to an external load or receiving electrical energy from an external supply (not shown). The pack terminals 701 are ideally connected to the output of a first and last circuit block.

The circuit module of the depicted example includes six sets of terminals configured to couple with corresponding battery cell units, each set of terminals having a positive terminal, and a corresponding negative terminal. In particular, the circuit block 702 of the circuit module includes the negative terminal of a first set of terminals C1 and the positive terminal of a second set of terminals C2 which are in turn coupled to a switching assembly. This switching assembly is that described above with reference to 131a of FIG. 1, and includes a first switch S1 configured to connect battery cell unit C1 to the circuit module when closed, a second switch S2 configured to in positive polarity bypass battery cell unit C1 when closed, a third switch S4 configured to connect battery cell unit C2 to the circuit module when closed, a fourth switch S3 configured to in positive polarity bypass battery cell unit C2 when closed. Furthermore, the switching assembly this embodiments includes additional fifth S5 and sixth S6 switches which, when both closed, allow both battery cell units C1 and C2 to be configured in the opposite polarity.

In operation, battery cell units C1 and C2 are positively connected to the circuit module when switches S1 and S4 are closed and switches S2, S3, S5, and S6 are open. When both battery cell units are considered positively connected, both cell units C1 and C2 have their respectively positive terminal connected towards the connection to a next switching assembly connecting towards cell unit C3.

Conversely, battery cell units C1 and C2 are negatively connected to the circuit module when switches S1, S2, S3 and S4 are open and switches S5 and S6 are closed. When both battery cell units are considered negatively connected, both cell units C1 and C2 have their respectively negative terminal connected towards the connection to a next switching assembly connecting towards cell unit C3.

Any circuit block of a battery cell unit having cells desired to be switched into an opposing polarity may therefore incorporate the fifth and sixth switches S5, S6 as shown. In some embodiments, the fifth and sixth switches are included for each cell block in the battery cell unit therefore allowing equal positive and negative voltages to be generated at the cell terminals 701. In other embodiments, a selection of circuit blocks in a battery cell unit incorporate the fifth and sixth switches S5, S6. In this way, a full voltage of one polarity can be generated on at the cell terminals, and a part opposing voltage. Where a part opposing voltage is desired, those cells remaining in the battery cell unit which have not had the polarity reversed would be bypassed by switches S1-S4 of the applicable circuit block.

When positively or when negatively connected, it is also possible to connect only either one of cell units C1 and C2. For example, C1 is bypassed and C2 negatively connected when switches S3 and S5 are closed and switches S1, S2, S4 and S6 are open. With reference to circuit block 701, various switching states are shown in the table below.

| Connection status | Closed switches | Open switches |
| --- | --- | --- |
| Positive: C1 connected, C2 connected | S1, S4 | S2, S3, S5, S6 |
| Positive: C1 bypassed, C2 connected | S2, S4 | S1, S3, S5, S6 |
| Positive: C1 connected, C2 bypassed | S1, S3 | S2, S4, S5, S6 |
| Negative: C1 connected, C2 connected | S5, S6 | S1, S2, S3, S4 |
| Negative: C1 bypassed, C2 connected | S3, S5 | S1, S2, S4, S6 |

| Connection status | Closed switches | Open switches |
| --- | --- | --- |
| Negative: C1 connected, C2 bypassed | S2, S6 | S1, S3, S4, S5 |
| Both bypassed: C1 bypassed, C2 bypassed | S2, S3 | S1, S4, S5, S6 |

Similarly, on an opposite end of the circuit module, the positive terminal of a first set of terminals C5 and a second set of terminals C6 coupled to another switching assembly as part of circuit block 703. This switching assembly includes a first switch S13 for connecting battery cell unit C5 to the circuit module when closed, a second switch S14 for in positive polarity bypassing battery cell unit C5 when closed, a third switch S16 for connecting battery cell unit C6 to the circuit module when closed, a fourth switch S15 for in positive polarity bypassing battery cell unit C6 when closed. Furthermore, the switching assembly includes a fifth switch S17 and sixth switch S18 which when both closed allow connecting both battery cell units C5 and C6 in opposite polarity. The circuit module comprising C5 and C6 can achieve equivalent switching states and polarities outlined for the circuit module comprising cell units C1 and C2.

One or more further intermediate circuit unit blocks are coupled between the end unit blocks and FIG. 7 shows one intermediate circuit block 704. For unit block 704, the battery cell units C3 and C4 are coupled to a switching assembly comprising switches S7-S12. Similar to cell units C1 and C2, battery cell units C3 and C4 can each be connected either positively or negatively and/or bypassed according to the switching states for switches S7-S12.

To reduce or increase the total number of cell units in battery system 700, one or more intermediate circuit unit blocks can be removed or added to the circuit between the end unit blocks.

In the battery system 700, the switches are arranged in such a way that for at least one switching state, a battery cell unit can be coupled to an adjacent battery cell unit with at most two closed switches in the current path connecting the two adjacent battery cell units. In addition, the system 700 allows a battery cell unit to be coupled to an adjacent or non-adjacent cell unit with at most two closed switches in the current path. For example, battery cell unit C1 can be coupled to adjacent battery cell unit C2 via a conductor and no switches; battery cell unit C1 can be coupled directly to non-adjacent battery cell unit C3 via conductors and two closed switches S3 and S7; battery cell unit C1 can be coupled directly to non-adjacent battery cell unit C4 via conductors and two closed switches S3 and S8. This configuration of circuit components advantageously reduces the total number of switches in the current path during operation to thereby reduce the ohmic energy losses due to on resistance of switches, and increasing the energy efficiency of the overall battery system 700.

Accordingly, to connect the positive terminal for battery cell unit C1 to the negative terminal of battery cell unit C4, whilst connecting intermediate battery cell units C2 and C3, the current only needs to pass through two switches S4 and S7. In this battery system 700, when all six battery cell units C1-C6 are to carry current, only six switches S1, S4, S7, S10, S13 and S16 are closed and all other switches are open. In this switching state, as the current only flows through six switches S1, S4, S7, S10, S13 and S16, a switch to active battery cell unit ratio of one is achieved. Battery system 700 therefore decreases switch associated energy loss.

Similar to previous figures, the system 700 of FIG. 7 also allows a plurality of switches to be located in close vicinity to one another and on a single side of the battery cell units, which in practice can decrease both manufacturing cost and space constraints.

In one exemplary implementation of the above described battery system there is a circuit module which couples a plurality of battery cell units. The circuit module includes a first set of terminals C1 having a positive terminal and a negative terminal for coupling to a first battery cell unit, a second set of terminals C2 having a positive terminal and a negative terminal for coupling to a second battery cell unit, a third set of terminals C3 having a positive terminal and a negative terminal for coupling to a third battery cell unit, and a fourth set of terminals C4 having a positive terminal and a negative terminal for coupling to a fourth battery cell unit. The positive terminal of the first set of terminals C1 is coupled to the negative terminal of the second set of terminals C2 either directly or via one or more passive components The positive terminal of the third set of terminals C3 is coupled to the negative terminal of the fourth set of terminals C4 either directly or via one or more passive components. The negative terminal of the first set of terminals C1, the positive terminal of the second set of terminals C2, at least one of the terminals of the third set of terminals C3 and at least one of the terminals of the fourth set of terminals C4 each being coupled to a switching assembly comprising switches S1-S18. The switching assemblies are operatively configured to selectively connect or disconnect each one of the battery cell units, each switching assembly including one or more switching devices, each switching device operable in a conductive state and a non-conductive state. The switching assemblies are operatively configured to selectively allow operating in a plurality of states in which any two or more battery cell units are connected in series. Each state includes a charging cycle and a discharging cycle of the battery cell units connected in series, the plurality of states including:

a first state in which the first battery cell unit C1 and the second battery cell unit C2 are electrically connected in series and the third battery cell unit C3 is disconnected, achieved for example by switches S1, S4, S8, S9, S14 and S15 being in a conductive state while all other switches shown are in a non-conductive state;

a second state in which the first battery cell unit C1 and the third battery cell unit C3 are electrically connected in series and the second battery cell unit C2 is disconnected, achieved for example by switches S1, S3, S7, S9, S14 and S15 being in a conductive state while all other switches shown are in a non-conductive state;

a third state in which the second battery cell unit C2 and the third battery cell unit C3 are electrically connected in series and the first battery cell unit C1 is disconnected, achieved for example by switches S2, S4, S7, S9, S14 and S15 being in a conductive state while all other switches shown are in a non-conductive state;

a fourth state in which the first battery cell unit C1, the second battery cell unit C2 and the fourth battery cell unit C4 are electrically connected in series and the third battery cell unit C3 is disconnected, achieved for example by switches S1, S4, S8, S10, S14 and S15 being in a conductive state while all other switches shown are in a non-conductive state; and a fifth state in which the first battery cell unit C1, the second battery cell unit C2, the third battery cell unit C3 and the fourth battery cell unit C4 are electrically connected in series, achieved for example by switches S1, S4, S7, S10, S14 and S15 being in a conductive state while all other switches shown are in a non-conductive state.

The switching assemblies are operatively configured to selectively allow operating in a plurality of connection modes, the plurality of connection modes including:

a first connection mode in which a series-connection of two or more battery cell units connect to the battery system output in a first electrical polarity, achieved for example by switches S1, S4, S8, S9, S14 and S15 being in a conductive state while all other switches shown are in a non-conductive state, connecting C1 and C2 between terminals of the battery system in one polarity; and a second connection mode in which a series-connection of two or more battery cell units connect to the battery system output in a second polarity that differs from the electrical polarity of the first electrical polarity, achieved for example by S5, S6, S8, S9, S14 and S15 being in a conductive state while all other switches shown are in a non-conductive state, connecting C1 and C2 between terminals of the battery system in a second and differing polarity.

The first battery cell unit C1, the second battery cell unit C2, the third battery cell unit C3 and the fourth battery cell unit C4 are adjacently positioned to one another such that the fifth state is achieved via a connection path having a minimum number of conducting switching devices within the circuit module.

A series connection path between the second battery cell unit C2 and the third battery cell unit C3 includes a maximum of two switching devices S4 and S7 operating in the conductive state when the second battery cell unit C2 and the third battery cell unit C3 are connected in series.

In some embodiments, each switching assembly includes a first switching device for connecting an associated battery cell unit, and a second switching device for disconnecting the associated battery cell unit. For example, cell unit C1 can be connected when switch S1 is in conductive mode, and in positive polarity disconnected when switch S2 in in conductive mode.

In one embodiment, switches S1-S18 is a transistor or several parallel-connected transistors or equivalent component or combination of components. In other embodiments, one or more of switches S1-18 are two or more series-connected transistors. This embodiment may be preferred in situations where the series connection of two or more transistors increases the switch terminal voltage capability. Other series and parallel combinations of transistors can be implemented to improve current and/or voltage conduction capability as desired.

The switching assemblies are operable to selectively connect or disconnect any one or more of the battery cell units so as to vary a total voltage output from the plurality of battery cell units. Time varying voltages are also able to be generated by selective time varying connection or disconnection of battery cell units. For example, a total voltage output mimicking a mains AC voltage can be generated by sequential connection of battery cell units equivalent to a desired mains voltage over a time period which mimics a mains AC frequency.

In some embodiments, the battery system further includes a battery mount configured to allow one or more battery cell units to be mounted for coupling to the circuit module. All switching assemblies of the circuit module are located to one side of the battery mount.

In some embodiments, the battery system further includes a controller (not shown) for controlling the switching assemblies of the circuit module. The controller is configured to control the switching assemblies based on the charge and discharge behaviour of the battery cell units. In some embodiments, the controller is further configured to determine the charge and discharge behaviour of each battery cell unit based on the voltage, current and/or temperature of the battery cell unit during charging and/or discharging. In some embodiments, the controller is further configured to compare a measured voltage, current and/or temperature of the battery cell unit with predetermined voltage, current and/or temperature ranges, determine one or more of the battery cell units to connect and/or bypass, and control the switching assemblies to connect or bypass each battery cell unit.

Figure 8:
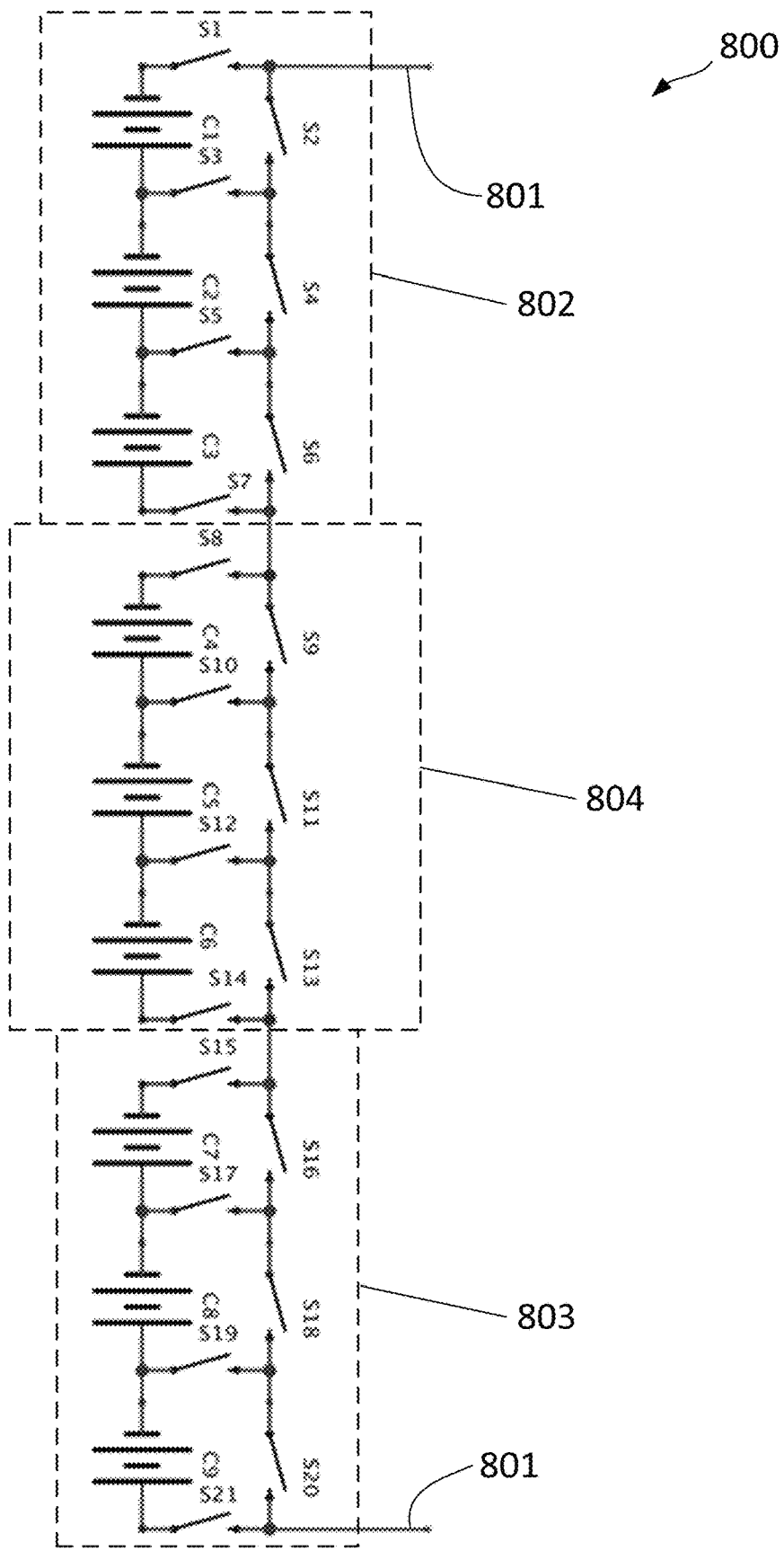
FIG. 8 is a circuit diagram of a battery system according to a further embodiment of the invention.

FIG. 8 shows another battery system 800 which is configured to allow a reduction in system on-resistance and associated energy losses by battery cell units, of which three or more battery cell units may have consecutive terminals connected to one-another. This is achieved by reducing the total number of closed switches in the current path in certain switching states as further explained below. FIG. 3 shows an embodiment in which three battery cell units are permanently connected in series with one another. Equivalent embodiments having four, five or more permanently series-connected battery cell units can equally be achieved.

The battery system includes a battery cell circuit module 802 configured to receive three battery modules (C1-C3). The exemplary battery system 800 shows three series-connected battery cell modules which include the cells C1-C9 coupled thereto. However, the battery modules may have any suitable number of series-connected battery cell units. The battery system 800 includes battery pack terminals 801 for providing electrical energy to an external load or receiving electrical energy from an external supply (not shown).

The circuit module includes nine sets of terminals for coupling with the battery cell units, each terminal set having a positive terminals C1a, C2a, C3a, C4a, C5a, C6a, C7a, C8a, C9a, and a corresponding negative terminals C1b, C2b, C3b, C4b, C5b, C6b, C7b, C8b, C9b. Each terminal set C1-C9 is configured for coupling to a battery cell unit.

In the battery system 800, the components of the circuit module are also arranged in such a way that a positive terminal of one set of terminals C1a, C2a, C4a, C5a, C7a, C8a are directly coupled to the negative terminal of an adjacent set of terminals C2b, C3b, C5b, C6b, C8b, C9b by a conductor.

The negative terminal of a first set of terminals C1 is coupled to a switching assembly which includes a first switch S1 for connecting battery cell unit C1 to the circuit module when closed and a second switch S2 for bypassing battery cell unit C1 when closed. More particularly, battery cell unit C1 is connected to the circuit module when the first switch S1 is closed and the second switch S2 is open and the battery cell unit C1 is bypassed from the circuit module when the first switch S1 is open and the second switch S2 is closed. The circuit layout including the set of terminals and the switching assembly forms a first end circuit unit bock 802.

Similarly, on an opposite end of the circuit module 803, the positive terminal of terminal set C9 is coupled to the switching assembly of module 803. In a similar manner to the switching assembly of module 802, the switching assembly of module 802 includes a first switch S21 for connecting battery cell unit C9 to the circuit module when closed and a second switch S20 for bypassing battery cell unit C9 when closed. The circuit layout including: the set of terminals and the switching assembly forms a second end circuit unit block 802.

Another number of additional circuit unit modules are coupled between the two end circuit modules 802, 803. For example, one additional circuit module 804 is shown between modules 802 and 803. For circuit module 802, the battery cell units C1, C2 and C3 are coupled to a switching assembly comprising switches S1, S2, S3, S4, S5, S6, and S7. Battery cell units C1, C2 and C3 can each be connected and/or bypassed according to the switching states for switches S1, S2, S3, S4, S5, S6, and S7.

| Connection status | Conductive switches | Non-conductive switches |
|---|---|---|
| C1 connected, C2 connected, C3 connected | S1, S7 | S2, S3, S4, S5, S6 |
| C1 connected, C2 connected, C3 bypassed | S1, S5, S6 | S2, S3, S4, S7 |
| C1 connected, C2 bypassed, C3 connected | Not feasible | |
| C1 connected, C2 bypassed, C3 bypassed | S1, S3, S4, S6 | S2, S5, S7 |
| C1 bypassed, C2 connected, C3 connected | S2, S3, S7 | S1, S4, S5, S6 |
| C1 bypassed, C2 connected, C3 bypassed | S2, S3, S5, S6 | S1, S4, S7 |
| C1 bypassed, C2 bypassed, C3 connected | S2, S4, S5, S7 | S1, S3, S6 |
| C1 bypassed, C2 bypassed, C3 bypassed | S2, S4, S6 | S1, S3, S5, S7 |

Battery cell units C1, C2 and C3 are all connected to the circuit module 802 when switches S1 and S7 are closed and at other switches are open; cell units C1 and C2 are both connected to the circuit module, but C3 is bypassed when switches S1, S5 and S6 are closed and at other switches are open; and cell units C1, C2 and C3 are all bypassed from the circuit module when switches S2, 34 and SB are closed and at other switches are open. With the exception that battery cell units C1 and C3 cannot both be connected to the circuit module if cell unit C2 is in a bypassed state, any combination of cell units C1, C2 and C3 may be connected to or bypassed from the circuit module according to the switching states for switches S1, S2, S3, S4, S5, S6, and S7. Circuit unit module 803 has cat units C7, C8 and C9 operates in the same manner as circuit unit block 802 with respect to the operation of cell units C1, C2 and C3.

To reduce or increase the total number of cell units in battery system 800, one or more intermediate circuit unit blocks can be removed or added to the circuit between end unit blocks.

In battery system 800, the switches S1-S21 are arranged in such a way that for at least one switching state, a battery cell unit can be coupled to an adjacent battery cell unit with at most two closed switches in the current path connecting the two adjacent battery cell units. In addition, the system allows a battery cell unit to be coupled to an adjacent or non-adjacent cell unit with at most two closed switches in the current path. For example, battery cell unit C1 can be coupled to adjacent battery cell unit C2 via a conductor and no switches; and battery cell unit C3 can be coupled directly to battery cell unit C4 via conductors and two closed switches S7 and S8. This configuration of circuit components advantageously reduces the total number of switches in the current path during operation to thereby reduce the ohmic energy losses due to on resistance of switches, and increasing the energy efficiency of the overall battery system 800.

Accordingly, to connect the positive terminal for battery cell unit C1 to the negative terminal of battery cell unit C4, whilst connecting intermediate battery cell units C2 and C3, the current only needs to pass through two switches S7 and S8. In this battery system 800, when all nine battery cell units C1-C9 are to carry current, only six switches S1, S7, S8, S14, S15 and S21 are closed and all other switches are open. In this switching state, as the current only flows through six switches S1, S7, S8, S14, S15 and S21, a switch to active battery cell unit ratio of less than one is achieved. Battery system 800 therefore decreases switch associated energy loss in this switching state.

Similar to previous figures, the system 800 of FIG. 8 also allows a plurality of switches to be located in close vicinity to one another and on a single side of the battery cell units, which in practice can decrease both manufacturing cost and space constraints.

While FIG. 8 shows an embodiment in which the terminals of three battery cell units are connected in series with one another directly or via passive elements, similar embodiments having four, five or more permanently series-connected battery cell units C4-C6 within each circuit module 804 can equally be achieved.

In one exemplary implementation of the above described battery system, the system has a circuit module that couples a plurality of battery cell units. The circuit module includes: a first set of terminals C2 having a positive terminal and a negative terminal for coupling to a first battery cell unit; a second set of terminals C3 having a positive terminal and a negative terminal for coupling to a second battery cell unit; a third set of terminals C4 having a positive terminal and a negative terminal for coupling to a third battery cell unit; a fourth set of terminals C5 having a positive terminal and a negative terminal for coupling to a fourth battery cell unit; and a fifth set of terminals C6 having a positive terminal and a negative terminal for coupling to a fifth battery cell unit.

The positive terminal of the first set of terminals C2 is coupled to the negative terminal of the second set of terminals C3 either directly or via one or more passive components. The positive terminal of the third set of terminals C4 is coupled to the negative terminal of the fourth set of terminals C5 either directly or via one or more passive components. The positive terminal of the fourth set of terminals C5 is coupled to the negative terminal of the fifth set of terminals C6 either directly or via one or more passive components. The negative terminal of the first set of terminals C2, the positive terminal of the second set of terminals C3, at least one of the terminals of the third set of terminals C4, at least one of the terminals of the fourth set of terminals C5, and at least one of the fifth set of terminals C6 each being coupled to a switching assembly.

The switching assemblies are operatively configured to selectively connect or disconnect each one of the battery cell units, each switching assembly includes one or more switching devices operable in a conductive state and a non-conductive state. The switching assemblies are operatively configured to selectively allow operating in a plurality of states in which any two or more battery cell units are connected in series, each state including a charging cycle and a discharging cycle of the battery cell units connected in series, the plurality of states including:

a first state in which the first battery cell unit C2 and the second battery cell unit C3 are electrically connected in series and the third battery cell unit C4 is disconnected, achieved for example by switches S2, S3, S7, S9, S11, S13, S16, S18 and S20 being in a conductive state while all other switches shown are in a non-conductive state;

a second state in which the first battery cell unit C2 and the third battery cell unit C4 are electrically connected in series and the second battery cell unit C3 is disconnected, achieved for example by switches S2, S3, S5, S6, S8, S10, S11, S13, S16, S18 and S20 being in a conductive state while all other switches shown are in a non-conductive state;

a third state in which the second battery cell unit C3 and the third battery cell unit C4 are electrically connected in series and the first battery cell unit C2 is disconnected, achieved for example by switches S2, S4, S5, S7, S8, S10, S11, S13, S16, S18 and S20 being in a conductive state while all other switches shown are in a non-conductive state;

a fourth state in which the first battery cell unit C2, the second battery cell unit C3 and the fourth battery cell unit C5 are electrically connected in series and the third battery cell unit C4 is disconnected, achieved for example by switches S2, S3, S7, S9, S10, S12, S13, S16, S18 and S20 being in a conductive state while all other switches shown are in a non-conductive state;

a fifth state in which the first battery cell unit C2, the second battery cell unit C3, the third battery cell unit C4, the fourth battery cell unit C5 and the fifth battery cell unit C6 are electrically connected in series, achieved for example by switches S2, S3, S7, S8, S14, S16, S18 and S20 being in a conductive state while all other switches shown are in a non-conductive state; and a sixth state in which the first battery cell unit C2, the second battery cell unit C3, the fourth battery cell unit C5 and the fifth battery cell unit C6 are electrically connected in series, and the third battery cell unit C4 is disconnected, achieved for example by switches S2, S3, S7, S9, S10, S11, S14, S16, S18 and S20 being in a conductive state while all other switches shown are in a non-conductive state.

In some embodiments, the switching assembly includes a first switching device for connecting an associated battery cell unit, and a second switching device for disconnecting the associated battery cell unit. For example, cell unit C1 can be connected when switch S1 is in conductive mode, and disconnected when switch S2 in in conductive mode.

In one embodiment, switches S1-S21 are a transistor. In other embodiments, switches S1-S21 may each comprise several parallel-connected transistors, which may provide an increased current capability and/or a decreased collective resistance when the several parallel connected transistors are in conductive mode. In other embodiments, one or more of switches S1-S21 may comprise two or more series-connected transistors, whereby the series connection may provide an increased switch terminal voltage capability. Other combinations of parallel and/or series transistors may be utilised as desired.

The switching assemblies are operatively configured to selectively connect or disconnect any one or more of the battery cell units so as to vary a voltage output measured across the output terminals.

In some embodiments, the system includes the aforementioned circuit modules alongside a plurality of battery cell units C1-C9 coupled to the circuit module.

In some embodiments, the system includes a battery mount configured to allow one or more battery cell units to be mounted for coupling to the circuit module. All switching assemblies of the circuit module are located to one side of the battery mount.

In some embodiments, the battery system includes a controller for controlling the switching assemblies of the circuit module. The controller may control the switching assemblies based on the charge and discharge behaviour of the battery cell units. The controller may further determine the charge and discharge behaviour of each battery cell unit based on the voltage, current and/or temperature of the battery cell unit during charging and/or discharging. The controller may further compare a measured voltage, current and/or temperature of the battery cell unit with predetermined voltage, current and/or temperature ranges, determines the battery cell units to connect and/or bypass, and controls the switching assemblies to connect or bypass each battery cell unit.

Interpretation

This specification, including the claims, is intended to be interpreted as follows:

Embodiments or examples described in the specification are intended to be illustrative of the invention, without limiting the scope thereof. The invention is capable of being practised with various modifications and additions as will readily occur to those skilled in the art. Accordingly, it is to be understood that the scope of the invention is not to be limited to the exact construction and operation described or illustrated, but only by the following claims.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

In the specification, including the claims, the term "comprise", and variants of that term such as "comprises" or "comprising", are used to mean "including but not limited to", unless expressly specified otherwise, or unless in the context or usage an exclusive interpretation of the term is required.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

Reference to any background art or prior art in this specification is not an admission such background art or prior art constitutes common general knowledge in the relevant field or is otherwise admissible prior art in relation to the validity of the claims.

The invention claimed is:

1. A circuit module for coupling a plurality of battery cell units, the circuit module including
a first set of terminals having a positive terminal and a negative terminal for coupling to a first battery cell unit,
a second set of terminals having a positive terminal and a negative terminal for coupling to a second battery cell unit,
a third set of terminals having a positive terminal and a negative terminal for coupling to a third battery cell unit, and
a fourth set of terminals having a positive terminal and a negative terminal for coupling to a fourth battery cell unit,
the positive terminal of the first set of terminals being coupled to the negative terminal of the second set of terminals either directly or via one or more passive components,
the positive terminal of the third set of terminals being coupled to the negative terminal of the fourth set of terminals either directly or via one or more passive components,
the negative terminal of the first set of terminals, the positive terminal of the second set of terminals, at least one of the terminals of the third set of terminals and at least one of the terminals of the fourth set of terminals each being coupled to a switching assembly, and
wherein the switching assemblies are operatively configured to selectively connect or disconnect each one of the battery cell units, each switching assembly including one or more switching devices, each switching device operable in a conductive state and a non-conductive state,
wherein the switching assemblies are operatively configured to selectively allow operating in a plurality of states in which any two or more battery cell units are connected in series, each state including a charging cycle and a discharging cycle of the battery cell units connected in series, the plurality of states including
a first state in which the first battery cell unit and the second battery cell unit are electrically connected in series and the third battery cell unit is disconnected,
a second state in which the first battery cell unit and the third battery cell unit are electrically connected in series and the second battery cell unit is disconnected,
a third state in which the second battery cell unit and the third battery cell unit are electrically connected in series and the first battery cell unit is disconnected,
a fourth state in which the first battery cell unit, the second battery cell unit and the fourth battery cell unit are electrically connected in series and the third battery cell unit is disconnected, and
a fifth state in which the first battery cell unit, the second battery cell unit, the third battery cell unit and the fourth battery cell unit are electrically connected in series, and
wherein the switching assemblies are operatively configured to selectively allow operating in a plurality of connection modes, the plurality of connection modes including
a first connection mode in which a series-connection of two or more battery cell units connect to the circuit module output in a first electrical polarity, and
a second connection mode in which a series-connection of two or more battery cell units connect to the circuit module output in a second polarity that differs from the electrical polarity of the first electrical polarity,
wherein the first battery cell unit, the second battery cell unit, the third battery cell unit and the fourth battery cell unit are adjacently positioned to one another such that the fifth state is achieved via a connection path having a minimum number of conducting switching devices within the circuit module, and
wherein when the second battery cell unit and the third battery cell unit are connected in series, a series connection path between the second battery cell unit and the third battery cell unit includes a maximum of two switching devices operating in the conductive state.

2. A circuit module of claim 1, wherein each switching assembly includes a first switching device for connecting an associated battery cell unit, and a second switching device for disconnecting the associated battery cell unit.

3. A circuit module of claim 1, wherein the switching assemblies include one or more transistors.

4. A circuit module of claim 1, wherein the switching assemblies are operatively configured to selectively connect or disconnect any one or more of the battery cell units according to a desired total voltage output from the plurality of battery cell units.

5. A battery system including:
one or more circuit modules of claim 1, and
a plurality of battery cell units coupled to the circuit module.

6. The circuit module of claim 1, further including a battery mount configured to allow one or more battery cell units to be mounted for coupling to the circuit module, wherein all switching assemblies of the circuit module are located to one side of the battery mount.

7. The circuit module of claim 1, further including a controller configured to control the switching assemblies of the circuit module.

8. The circuit module of claim 7, wherein the controller is configured to control the switching assemblies based on a determined the charge and discharge behaviour of the battery cell units.

9. The circuit module of claim 7, wherein the controller is configured to determine the charge and discharge behaviour of each battery cell unit based on the voltage, current and/or temperature of the battery cell unit during charging and/or discharging.

10. The circuit module of claim 7, wherein the controller is configured to:
compare a measured voltage, current and/or temperature of the battery cell unit with predetermined voltage, current and/or temperature ranges,
determine the battery cell units to connect and/or bypass, and
control the switching assemblies to connect or bypass each battery cell unit.

11. A circuit module for coupling a plurality of battery cell units, the circuit module including
a first set of terminals having a positive terminal and a negative terminal for coupling to a first battery cell unit,
a second set of terminals having a positive terminal and a negative terminal for coupling to a second battery cell unit,
a third set of terminals having a positive terminal and a negative terminal for coupling to a third battery cell unit, and
a fourth set of terminals having a positive terminal and a negative terminal for coupling to a fourth battery cell unit,
a fifth set of terminals having a positive terminal and a negative terminal for coupling to a fifth battery cell unit,
the positive terminal of the first set of terminals being coupled to the negative terminal of the second set of terminals either directly or via one or more passive components,
the positive terminal of the third set of terminals being coupled to the negative terminal of the fourth set of terminals either directly or via one or more passive components,
the positive terminal of the fourth set of terminals being coupled to the negative terminal of the fifth set of terminals either directly or via one or more passive components,
the negative terminal of the first set of terminals, the positive terminal of the second set of terminals, at least one of the terminals of the third set of terminals, at least one of the terminals of the fourth set of terminals, and at least one of the fifth set of terminals each being coupled to a switching assembly, and
wherein the switching assemblies are operatively configured to selectively connect or disconnect each one of the battery cell units, each switching assembly including one or more switching devices, each switching device operable in a conductive state and a non-conductive state,
wherein the switching assemblies are operatively configured to selectively allow operating in a plurality of states in which any two or more battery cell units are connected in series, each state including a charging cycle and a discharging cycle of the battery cell units connected in series, the plurality of states including
a first state in which the first battery cell unit and the second battery cell unit are electrically connected in series and the third battery cell unit is disconnected,
a second state in which the first battery cell unit and the third battery cell unit are electrically connected in series and the second battery cell unit is disconnected,
a third state in which the second battery cell unit and the third battery cell unit are electrically connected in series and the first battery cell unit is disconnected,
a fourth state in which the first battery cell unit, the second battery cell unit and the fourth battery cell unit are electrically connected in series and the third battery cell unit is disconnected,
a fifth state in which the first battery cell unit, the second battery cell unit, the third battery cell unit, the fourth battery cell unit and the fifth battery cell unit are electrically connected in series, and
a sixth state in which the first battery cell unit, the second battery cell unit, the fourth battery cell unit and the fifth battery cell unit are electrically connected in series, and the third battery cell unit is disconnected.

12. The circuit module of claim 11, wherein each switching assembly includes a first switching device for connecting an associated battery cell unit, and a second switching device for disconnecting the associated battery cell unit.

13. The circuit module of claim 11, wherein the switching assemblies include one or more transistors.

14. The circuit module of claim 11, wherein the switching assemblies are operatively configured to selectively connect or disconnect any one or more of the battery cell units according to a desired total voltage output from the plurality of battery cell units.

15. A battery system including:
one or more circuit modules of claim 11, and
a plurality of battery cell units coupled to the circuit module.

16. The circuit module of claim 11, further including a battery mount configured to allow one or more battery cell units to be mounted for coupling to the circuit module, wherein all switching assemblies of the circuit module are located to one side of the battery mount.

17. The circuit module of claim 11, further including a controller configured to control the switching assemblies of the circuit module.

18. The circuit module of claim 17, wherein the controller is configured to control the switching assemblies based on the charge and discharge behaviour of the battery cell units.

19. The circuit module of claim 17, wherein the controller is configured to determine the charge and discharge behaviour of each battery cell unit based on the voltage, current and/or temperature of the battery cell unit during charging and/or discharging.

20. The circuit module of claim 17, wherein the controller is configured to:
- compare a measured voltage, current and/or temperature of the battery cell unit with predetermined voltage, current and/or temperature ranges,
- determine the battery cell units to connect and/or bypass, and
- control the switching assemblies to connect or bypass each battery cell unit.

\* \* \* \* \*